(12) United States Patent
McKinnon et al.

(10) Patent No.: US 7,513,462 B1
(45) Date of Patent: Apr. 7, 2009

(54) SATELLITE EQUIPMENT MOUNTING PANEL

(75) Inventors: Douglas V. McKinnon, Montgomery Township, NJ (US); David J. Hentosh, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 743 days.

(21) Appl. No.: 11/147,354

(22) Filed: Jun. 8, 2005

(51) Int. Cl.
*B64G 1/44* (2006.01)
(52) U.S. Cl. .................................. 244/173.1; 244/173.2
(58) Field of Classification Search ............... 244/173.1, 244/173.2, 172.3
See application file for complete search history.

(56) References Cited

U.S. PATENT DOCUMENTS

| | | | |
|---|---|---|---|
| 4,009,851 A * | 3/1977 | Cable ....................... | 244/173.1 |
| 5,284,095 A * | 2/1994 | Sabah ....................... | 102/293 |
| 5,806,800 A | 9/1998 | Caplin | |
| 5,839,696 A | 11/1998 | Caplin et al. | |
| 7,118,076 B2 * | 10/2006 | Tjiptahardja et al. ..... | 244/171.8 |

* cited by examiner

*Primary Examiner*—J. Woodrow Eldred
(74) *Attorney, Agent, or Firm*—McDermott Will & Emery LLP

(57) ABSTRACT

A satellite payload structure includes one side that includes at least two equipment mounting panels. Each of the equipment mounting panels are oriented substantially parallel to each other such that when the satellite is deployed, each of the equipment mounting panels are substantially parallel to a vector pointing from the deployed location of the satellite to a point on the earth's surface. The point on the earth's surface is located vertically beneath the satellite such that the vector is substantially normal to the earth's surface.

16 Claims, 4 Drawing Sheets

US 7,513,462 B1

SATELLITE EQUIPMENT MOUNTING PANEL

TECHNICAL FIELD

This disclosure relates to panels for mounting equipment on-board a satellite and, more particularly, to orienting equipment mounting panels to efficiently utilize satellite payload space.

BACKGROUND

Satellites such as geostationary satellites carry hardware such as communication equipment and remote sensing equipment in a relatively small payload space. Along with the size constraints imposed on satellites by available space in launch vehicles, satellite payload space is also constrained by the other components included in the satellite. For example, fuel storage devices such as propellant tanks may require a substantial portion of satellite real estate. For such satellites, the design of the propellant tank or tanks may impinge upon the layout design of the satellite payload compartment. For example, a satellite propellant tank may be designed with a cylindrical space that is relatively short in height but wide in width. Due the relatively squat shape of the propellant tank, and to meet size requirements, electrical and electronic equipment is distributed on horizontally-stacked mounting panels that are positioned above the propellant tank. While these horizontally-stacked panels may provide appropriate equipment space for this propellant tank design, for other propellant tank designs, the size constraints of a launch vehicle may not be satisfied. Additionally, by horizontally-stacking the equipment mounting panels, heat generated by the electrical and electronic equipment populating the mounting panels may not be efficiently dissipated to hold the equipment within allowable temperature ranges.

SUMMARY OF THE DISCLOSURE

The subject matter disclosed herein solves these problems by providing a satellite payload structure that includes vertically-oriented equipment mounting panels. By vertically stacking the equipment mounting panels, electrical and electronic equipment may be positioned adjacent to one or more elongated propellant tanks while still complying with size constraints imposed by other portions of the satellite and the satellite launch vehicle. Along with accommodating more electrical and electronic equipment, more equipment is located proximate to thermal radiators that interface with the lower temperature environment of deep space, thereby increasing heat dissipation capacity and efficiency.

In accordance with an aspect of the disclosure, a satellite payload structure includes one side that includes at least two equipment mounting panels. Each of the equipment mounting panels are oriented substantially parallel to each other such that when the satellite is deployed, each of the equipment mounting panels are substantially parallel to a vector pointing from the deployed location of the satellite to a point on the earth's surface. The point on the earth's surface is located vertically beneath the satellite such that the vector is substantially normal to the earth's surface.

In one embodiment, the satellite payload structure may further include another side that is substantially parallel to the first side. This second side may include one or more equipment mounting panels that are positioned substantially parallel to the equipment mounting panels of the first side. In other arrangements, rather than being parallel, the second side may be substantially perpendicular to the first side. This second side that is substantially perpendicular to the first side may include one or more equipment mounting panels that are substantially parallel to the vector. Two or more of the equipment mounting panels may be thermally connected or thermally isolated. Further, one or more of the equipment mounting panels may be associated with a heat transport system. Additionally, the equipment mounting panels may be associated with a heat transport system that is thermally connected to a thermal radiator. In some arrangements, one or more of the equipment mounting panels may include a thermal radiator or be thermally connected to a thermal radiator. Also, one or more of the equipment mounting panels may be thermally connected to a portion of a capillary pump loop system, a loop heat pipe system, or other similar system. In one arrangement, one or more of the equipment mounting panels may allow the collector end of an amplifier to protrude from the first side. The satellite payload structure may further include a brace panel that may support one or more propellant tanks and the first side of the satellite payload structure. One of the equipment mounting panels may be connected to a surface mounted heat pipe or an embedded heat pipe.

In accordance with another aspect of the disclosure, a satellite payload structure includes two sides that each include two or more equipment mounting panels. The equipment mounting panels are oriented substantially parallel to each other such that when the satellite is deployed, each of the equipment mounting panels are substantially parallel to a vector pointing from the deployed location of the satellite to a point on the earth's surface located vertically beneath the satellite. At this point on the earth's surface, the vector is substantially normal to the earth's surface. The satellite payload structure also includes a top side that connects the first side and the second side to produce an inverted "U-shaped" structure.

In one embodiment, the inverted "U-shaped" structure may connect to a brace panel that supports one or more propellant tanks on-board the satellite. One or more of the equipment mounting panels may be thermally connected to a portion of a heat transport system.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

DETAILED DESCRIPTION OF THE EMBODIMENTS

Figure 1:
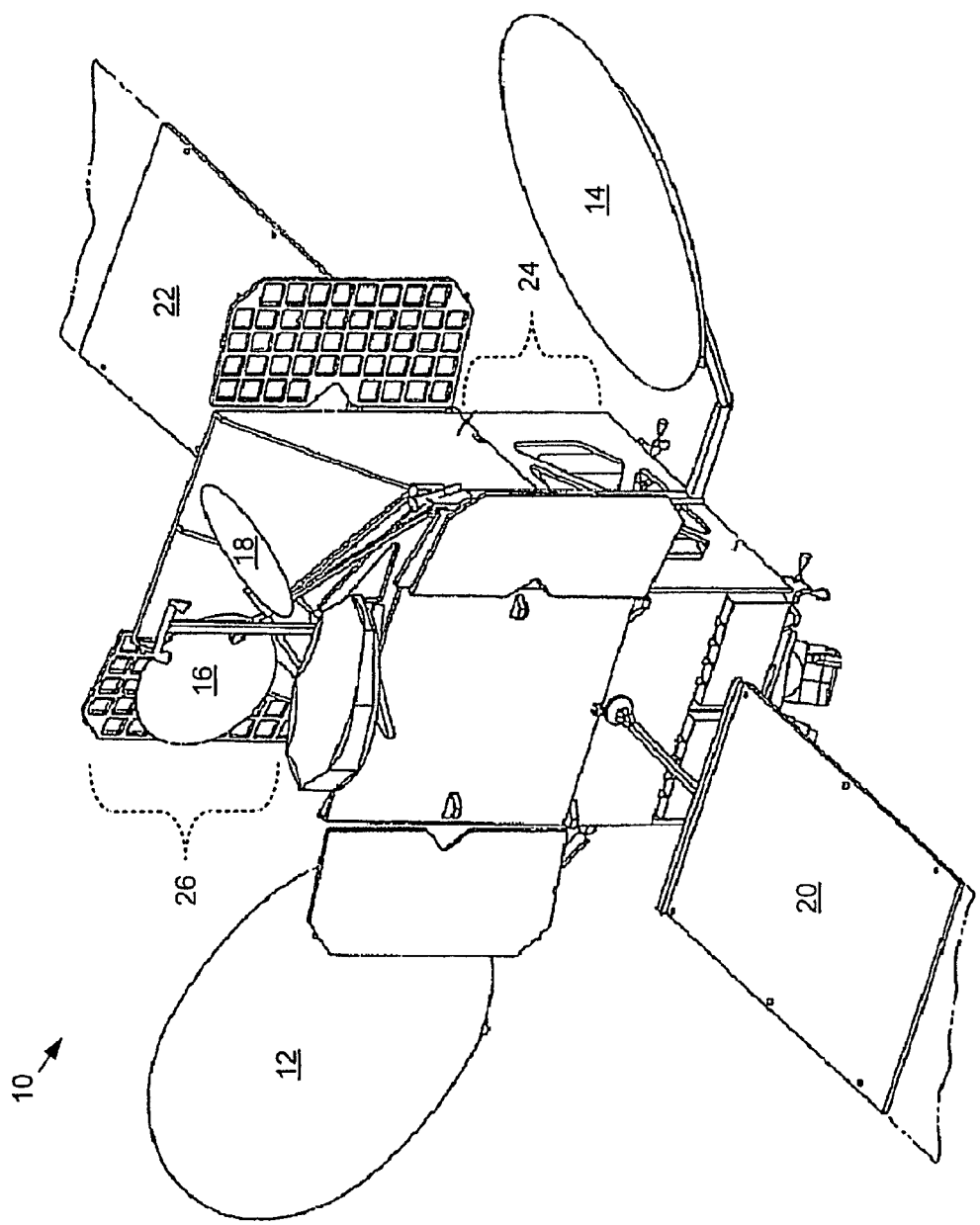
FIG. 1 is a diagrammatic view of a satellite that includes conventional horizontally-stacked equipment mounting panels.

Referring to FIG. 1, a satellite 10 is shown in a deployed position and includes four reflector dish antennas 12, 14, 16, 18 for transmitting and/or receiving radio frequency (RF) signals to or from other communication sites (e.g., stationary sites, mobile sites, etc.). To provide power for the communication operations, satellite 10 also includes two solar arrays 20, 22 (partially presented in the figure) for converting sunlight into electrical energy that may be stored in batteries on-board the satellite. Typically, solar arrays 20 and 22 are oriented such that the sun is substantially normal to the respective faces of the arrays. Additionally, a fuel storage module 24 is located in the lower portion of satellite 10. Typically fuel storage module 24 includes one or more propellant tanks that contain solid or fluid propellant. This propellant is used by engines on-board satellite 10 for deploying and adjusting the position or orientation of the satellite for variously assigned communication and/or remote sensing applications.

While the lower portion of satellite 10 stores propellant, the upper portion of the satellite includes a payload compartment 26 that stores electrical and electronic equipment to provide the RF transmission and/or reception capabilities of the satellite. For example, power supply systems, RF transmitter equipment (e.g., power amplifiers, transmit filters, etc.), RF receiver equipment (e.g. low noise amplifiers, receive filters, etc.), and/or other types of electrical power-consuming equipment may be included in payload compartment 26. Besides (or in combination with) the RF equipment, other types of communication and/or remote sensing equipment may be included in payload compartment 26. For example, infrared (IR) and/or optical transmission and reception equipment may be stored in payload compartment 26. Additionally, payload compartment 26 is thermally coupled to a group of thermal radiators that radiate heat generated by the electrical and electronic equipment in the payload compartment.

Due to size constraints imposed by the launch vehicle (e.g., a rocket, etc.) of satellite 10, the size of the satellite is correspondingly limited. Furthermore, different portions of satellite 10 may affect the overall size and layout of the satellite. For example, the size of fuel storage module 24 may limit the size of payload compartment 26. In particular, some propellant tank (or tanks) geometries may limit the size of the payload compartment. Due to the relatively short height and the long width and length of fuel storage compartment 24, a propellant tank stored in the compartment may be constrained to a squat shape with a short height and a wide diameter. Correspondingly, the size of payload module 26 is constrained based on the size and shape of fuel storage module 24 and by size constraints imposed by the launch vehicle.

Figure 2:
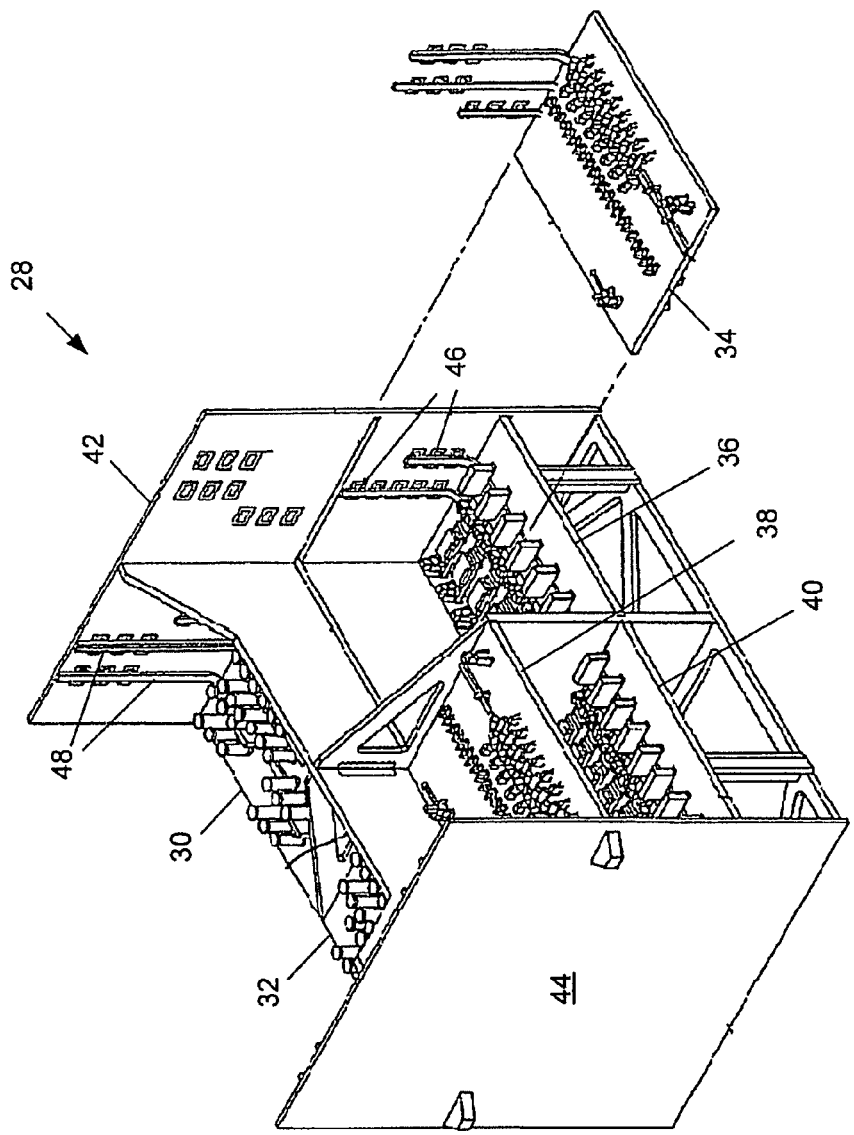
FIG. 2 is a diagrammatic view of a portion of a payload compartment included in the satellite shown in FIG. 1.

Referring to FIG. 2, a portion of payload compartment 26 is presented that is populated by electrical and electronic equipment to provide e.g., the communication and/or remote sensing capabilities of satellite 10. The equipment is positioned in a payload structure 28 that includes multiple panels 30, 32, 34, 36, 38, and 40. Each panel is substantially rectangular in shape and may be individually removed and reattached to payload structure 28. This modular designed is described in U.S. Pat. No. 5,839,696 to Caplin et al. and is incorporated by reference herein.

To meet the size constraints imposed by the geometry of the squat-shaped fuel storage module 24 and the launch vehicle, panels 30-40 are horizontally stacked in payload structure 28. By horizontally-stacking panels 30-40, the electrical and electronic equipment that populate the panels is horizontally distributed. Additionally, to radiate heat produced by the electrical and electronic equipment, payload structure 28 includes two fixed radiator panels 42, 44 that provide a thermal interface between the horizontal panels and the cold temperatures of deep space. To transfer heat to radiator panels 42 and 44, payload structure 28 includes a heat transfer system. In this example, heat pipes 46 and 48 thermally connect respective panels 30 and 36 to fixed radiator panel 42. Additional heat pipes, which are visually obscured, thermally connect the other panels to radiator panel 42 or 44. By way of the thermal connection provided by heat pipes 46 and 48, heat generated by the equipment on horizontally-oriented panels 30 and 36 is transferred to fixed radiator panel 42 and radiated.

By horizontally stacking panels 30-40 between fixed radiator panels 42 and 44, the electrical and electronic equipment populates payload compartment 28 without exceeding the size constraints imposed by the propellant tank (or tanks) included in fuel storage module 24 and imposed by the launch vehicle of satellite 10. However, with the ever-increasing need to provide more functionality and operational flexibility, satellite fuel consumption needs are being increased to extend satellite capabilities. To meet this increase in fuel consumption, a satellite propellant tank may be designed with a larger capacity to store more propellant. However, as mentioned, the size of the satellite fuel storage module may not be expanded beyond the limited payload capacity of the satellite launch vehicle. In one example to increase fuel capacity, a cylindrically-shaped propellant tank may be designed with an increased height and a smaller diameter. Based on this design, narrowing the diameter of the propellant tank produces additional space along side the thermal radiators of the satellite. However, increasing tank height while narrowing tank diameter decreases the amount of real estate for a satellite payload compartment located above the fuel storage module. Thus, increasing the capacity of the fuel storage module also reduces amount of space in which equipment mounting panels may be horizontally stacked above the fuel storage module.

Figure 3:
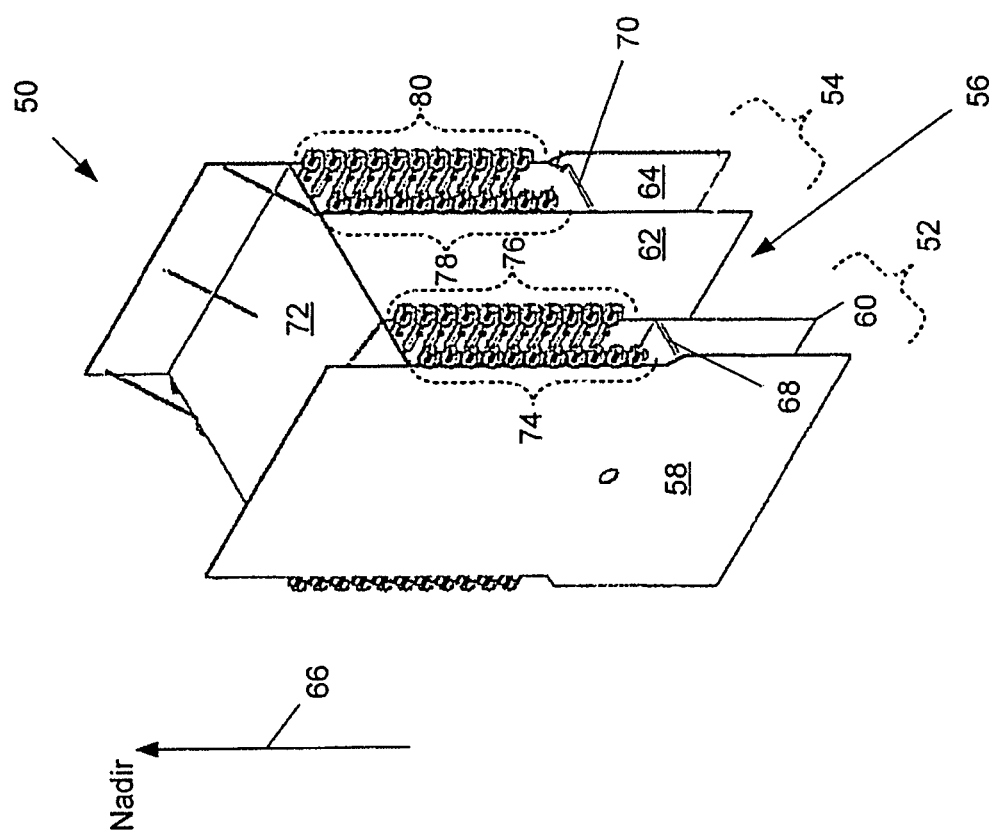
FIG. 3 is a diagrammatic view of a portion of a satellite payload structure with vertically-oriented equipment mounting panels for a satellite that includes one or more elongated propellant tanks.

Referring to FIG. 3, a satellite payload structure 50 is presented in which electrical and electronic equipment is populated among vertically-oriented equipment mounting panels. By vertically stacking the equipment mounting panels, the electrical and electronic equipment may be located in the additional space along side the elongated propellant tank (or tanks) while still complying with size constraints imposed by the fuel storage module and the satellite launch vehicle. Along with accommodating more electrical and electronic equipment, more equipment is located proximate to the thermal radiators that interface with the lower temperature environment of deep space, thereby increasing heat dissipation efficiency.

In this exemplary design, payload structure 50 includes two groups 52, 54 of vertically-oriented panels upon which electrical and electronic equipment is mounted. By separating the vertically-oriented panel groups 52 and 54, a spatial gap 56 is defined in which a fuel storage module may be inserted. By providing spatial gap 56, an elongated propellant tank (or tanks) may be used to provide fuel for deploying and adjusting the deployed position of the satellite. Furthermore, since electrical and electronic equipment may be mounted on the vertically-oriented panel groups 52 and 54, additional equipment space is provided compared to the reduced number of horizontally-mounted panels that could be positioned above an elongated propellant tank while still meeting the size constraints imposed by the satellite and the launch vehicle.

In this arrangement, each panel group 52 and 54 includes two individual equipment mounting panels upon which equipment may be populated. In particular, panel group 52 includes vertically-oriented equipment mounting panels 58 and 60 and panel group 54 includes vertically-oriented panels 62 and 64. However, it is understood that in other arrangements, each group of vertically-oriented panels may include more than two equipment mounting panels. Furthermore, payload structure 50 may include more than two groups of panels. For example, while panel groups 52 and 54 are positioned substantially parallel, a group of vertically-oriented equipment mounting panels may be positioned substantially perpendicular to either panel group to define another side of payload structure 50.

Whether oriented parallel, perpendicular, or by other angle relative to each other, each equipment mounting panel is substantially oriented in a vertical direction when the satellite is deployed (e.g., in orbit). By being vertically oriented, equipment mounting panels 58-64 are parallel to a vector 66 that points from the deployed location of the satellite to a point on the earth's surface directly below the satellite. At the intersection point on the earth's surface directly below the satellite, vector 66 is substantially normal (i.e., perpendicular) to the earth's surface. As is known in the art of satellite design and deployment, this vector direction that points on the earth's surface vertically beneath the satellite is known as "nadir".

Various types of material may be used to produce equipment mounting panels 58-64 to provide appropriate structural support for payload structure 50. For example, one or more of the panels may be implemented in a metallic material, a composite material, or another type of material known to one skilled in the art of satellite design. Additionally, the material type may be selected to assist with dissipating heat generated by the electrical and electronic equipment populating equipment mounting panels 58-64. For example, equipment mounting panels 58 and 64 may be implemented as thermal radiators since each view outer space when deployed. Also, one or more of equipment mounting panels 58-64 may be thermally connected for directing heat to one or more interfaces with the lower temperature environment of deep space. In this exemplary deign, a cross-panel 68 connects equipment mounting panels 58 and 60 such that heat is transferred to the outer surface of panel 58 that directly or indirectly (e.g., is connected to a thermal radiator) views the low temperature environment of outer space. Similarly, a cross-panel 70 thermally connects equipment mounting panels 62 and 64 such that heat is conducted to the outer surface of panel 64. Along with assisting thermal dissipation, additional panels may also provide structural support to payload structure 50. As shown in this example, a cross-panel 72 connects to panel groups 52 and 54 to define a top side of payload structure 50. In addition to forming this inverted "U-shaped" payload structure, cross-panel 72 may further increase thermal dissipation by thermally connecting panel groups 52 and 54. Also, individual or groups or equipment mounting panels may be connected to one or more thermal radiators for transferring heat to be radiated. For example, equipment mounting panels 60 and 62 may be connected to a deployed thermal radiator. By connecting to a thermal radiator, equipment mounting panels 60 and 62 transfer heat to the thermal radiator and maybe substantially thermally isolated from panels 58 and 64.

Alternatively, or in combination with thermally connecting two or more of the equipment mounting panels, one or more heat transport systems may be incorporated into payload structure 50. Such systems typically carry heat away, for example, to radiate the heat and/or spread the heat across a surface. Some heat transport systems include pipes that are embedded in or positioned near (e.g., surface mounted) the panels and carry a fluid (e.g., Freon, ammonia, etc.) to transfer heat. For example, a capillary pumped loop (CPL) or other similar two-phase thermal management device that uses capillary forces to transfer heat-carrying fluid to a low temperature sink may be incorporated. Other exemplary types of heat transport systems may be incorporated such as systems including heat pipes (HP), constant conductance heat pipes (CCHP), variable conductance heat pipes (VCHP), and/or loop heat pipes (LHP). Once acquired, the heat is carried away from the panel for radiation. For example, heat may be provided to one or more thermal radiators on-board the satellite for radiation.

Along with providing heat to one or more thermal radiators, the open geometry of payload structure 50 allows edges of each equipment mounting panel to view outer space during deployment. Thereby, heat may be directly radiated from an inner panel such as equipment mounting panels 60 and 62. To radiate the heat, various devices and structures known to one skilled in the art of heat radiation may be implemented. For example, each of the equipment mounting panels 58-64 in payload structure 50 are populated by traveling wave tube amplifiers (TWTA) that produce a substantial amount of heat during operation. Each TWTA uses an electron beam for amplifying RF signals. To absorb the spent electron beam, each TWTA also includes a collector that receives electrons from a respective beam in such a manner to reduce reflections. By absorbing the electrons, heat is produced by each respective collector. To radiate the heat, each collector is connected to a radiator that extends from an edge of one of the equipment mounting panels 58-64. In this particular arrangement, each of the radiators have a "paddle-wheel" shape and are identified in respective groups 74, 76, 78 and 80. By extending from equipment mounting panels 58-64, the radiators view the relatively low temperature of outer space and radiate the generated heat of the TWTAs. Also, along with TWTAs, other similar electronic devices such as solid-state power amplifiers (SSPA) may populate equipment mounting panels 58-64.

Figure 4:
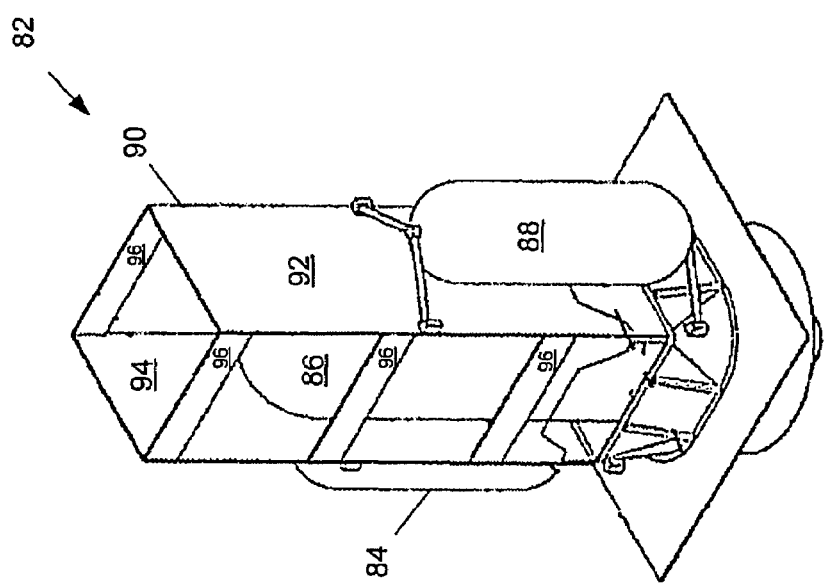
FIG. 4 is a diagrammatic view of a satellite propellant tank support structure that may be inserted within the satellite payload structure shown in FIG. 3.

Referring to FIG. 4, a propellant tank support structure 82 is presented that may be inserted into payload structure 50 (shown in FIG. 3). In this exemplary design, propellant tank support structure 82 includes three propellant tanks 84, 86 and 88 that provide propellant to the satellite that includes payload structure 50. To join the two structures, a frame structure 90 included in propellant tank support structure 82 is inserted into spatial gap 56 of payload structure 50. By inserting frame structure 90, the two groups 52 and 54 of vertically-oriented equipment mounting panels and sides 92 and 94 of propellant tank support structure 82 cover propellant tank 86. A series of bracing panels 96 (some of which are visually obscured) are used to secure frame structure 90 to payload structure 50 (and propellant tank 86). One or more of bracing panels 96 may include a portion of a heat transport system. In some arrangements these bracing panels 96 are removed prior to the launch, however, the panels may remain for additional structural support of payload structure 50 and propellant tank support structure 82 when the satellite is deployed.

A number of implementations have been described. Nevertheless, it will be understood that various modifications may be made. Accordingly, other implementations are within the scope of the following claims.

What is claimed is:

1. A satellite payload structure, comprising:
  a first side comprising a first group of at least two equipment mounting panels, the first group of at least two equipment mounting panels comprising a first equipment mounting panel and a second equipment mounting panel, the first equipment mounting panel substantially thermally isolated from the second equipment mounting panel;

a second side comprising a second group of at least two equipment mounting panels, the second group of at least two equipment mounting panels comprising a third equipment mounting panel and a fourth equipment mounting panel, the third equipment mounting panel substantially thermally isolated from the fourth equipment mounting panel;

a first radiator extending from an edge of the second equipment mounting panel, the first radiator configured to radiate heat and configured to be exposed to outer space;

a second radiator extending from an edge of the fourth equipment mounting panel, the second radiator configured to radiate heat and configured to be exposed to outer space;

a spatial gap separating the first group of at least two equipment mounting panels from the second group of at least two equipment mounting panels; and a fuel storage module disposed within the spatial gap.

2. The satellite payload structure of claim 1, wherein one of the first equipment mounting panel, the second equipment mounting panel, the third equipment mounting panel, and the fourth equipment mounting panel is associated with a heat transport system that is thermally connected to a thermal radiator.

3. The satellite payload structure of claim 1, wherein one of the first equipment mounting panel, the second equipment mounting panel, the third equipment mounting panel, and the fourth equipment mounting panel is thermally connected to a thermal radiator.

4. The satellite payload structure of claim 1, wherein one of the first equipment mounting panel, the second equipment mounting panel, the third equipment mounting panel, and the fourth equipment mounting panel is thermally connected to a portion of a capillary pump loop system.

5. The satellite payload structure of claim 1, wherein one of the first equipment mounting panel, the second equipment mounting panel, the third equipment mounting panel, and the fourth equipment mounting panel is thermally connected to a portion of a loop heat pipe system.

6. The satellite payload structure of claim 1, further comprising an amplifier configured to amplify radio frequency (RF) signals, the amplifier comprising a collector configured to receive electrons, the collector connected to the first radiator.

7. The satellite payload structure of claim 1, further comprising:

a brace panel configured to support at least one propellant tank and the first side of the satellite payload structure.

8. The satellite payload structure of claim 1, wherein one of the first equipment mounting panel, the second equipment mounting panel, the third equipment mounting panel, and the fourth equipment mounting panel includes a thermal radiator.

9. The satellite payload structure of claim 1, further comprising a heat pipe mounted on a surface of one of the first equipment mounting panel, the second equipment mounting panel, the third equipment mounting panel, and the fourth equipment mounting panel.

10. The satellite payload structure of claim 1, further comprising a heat pipe embedded in one of the first equipment mounting panel, the second equipment mounting panel, the third equipment mounting panel, and the fourth equipment mounting panel.

11. The satellite payload structure of claim 1, further comprising:

a top side configured to connect the first side and the second side to produce an inverted "U-shaped" structure.

12. The satellite payload structure of claim 11, wherein the inverted "U-shaped" structure connects to a brace panel configured to support at least one propellant tank on-board the satellite payload structure.

13. The satellite payload structure of claim 11, wherein at least one of the first equipment mounting panel, the second equipment mounting panel, the third equipment mounting panel, and the fourth equipment mounting panel is thermally connected to a portion of a heat transport system.

14. The satellite payload structure of claim 1, wherein one of the first equipment mounting panel, the second equipment mounting panel, the third equipment mounting panel, and the fourth equipment mounting panel is associated with a heat transport system.

15. The satellite payload structure of claim 1, wherein the first equipment mounting panel, the second equipment mounting panel, the third equipment mounting panel, and the fourth equipment mounting panel are parallel to one another, and wherein the second equipment mounting panel and the fourth equipment mounting panel are disposed between the first equipment mounting panel and the third equipment mounting panel.

16. The satellite payload structure of claim 1, further comprising:

a third radiator extending from an edge of the first equipment mounting panel, the third radiator configured to radiate heat and configured to be exposed to outer space; and a fourth radiator extending from an edge of the third equipment mounting panel, the fourth radiator configured to radiate heat and configured to be exposed to outer space, wherein the first equipment mounting panel, the second equipment mounting panel, the third equipment mounting panel, and the fourth equipment mounting panel are vertically oriented.

* * * * *